US008441658B2

(12) United States Patent
Cornelissen et al.

(10) Patent No.: US 8,441,658 B2
(45) Date of Patent: May 14, 2013

(54) PRINTING DEVICE

(75) Inventors: Joannes C. J. Cornelissen, Roermond (NL); Ronald W. C. M. Buskens, Weert (NL)

(73) Assignee: Oce-Technologies B.V., Venlo (NL)

( * ) Notice: Subject to any disclaimer, the term of this patent is extended or adjusted under 35 U.S.C. 154(b) by 672 days.

(21) Appl. No.: 12/326,730

(22) Filed: Dec. 2, 2008

(65) Prior Publication Data

US 2009/0141301 A1 Jun. 4, 2009

(30) Foreign Application Priority Data

Dec. 3, 2007 (EP) .................................... 07122098

(51) Int. Cl.
*G06K 15/00* (2006.01)

(52) U.S. Cl.
USPC ........................................................ 358/1.14

(58) Field of Classification Search .................. 358/1.14
See application file for complete search history.

(56) References Cited

U.S. PATENT DOCUMENTS

| | | | | |
|---|---|---|---|---|
| 3,588,472 | A | 6/1971 | Glaster et al. | |
| 4,327,993 | A | 5/1982 | Gauronski et al. | |
| 5,034,770 | A * | 7/1991 | O'Connell | 399/79 |
| 6,430,377 | B1 * | 8/2002 | Tsutsumi | 399/19 |
| 7,127,184 | B2 * | 10/2006 | Coriale et al. | 399/21 |
| 2007/0166055 | A1 * | 7/2007 | Yamauchi et al. | 399/9 |

FOREIGN PATENT DOCUMENTS

| | | | |
|---|---|---|---|
| EP | 0 478 349 | A2 | 4/1992 |
| JP | 57-68861 | A | 4/1982 |
| JP | 11-263507 | A | 9/1999 |
| JP | 2001-139220 | A | 5/2001 |

* cited by examiner

*Primary Examiner* — Marivelisse Santiago Cordero
*Assistant Examiner* — Mesfin Getaneh
(74) *Attorney, Agent, or Firm* — Brich, Stewart, Kolasch & Birch, LLP

(57) ABSTRACT

A printing device for printing on an image-receiving sheet includes an output unit for outputting printed image-receiving sheets to a finishing device. An interface is configured to connect to the finishing device. The interface is arranged for receiving an error signal from the finishing device. A communication unit outputs an error message to a user of the printing device. A control unit controls, when an error signal is received from the finishing device via the interface, a finisher error recovery procedure, wherein an error message is output to the user of the printing device by the communication unit. The error message contains the information that a number N of image-receiving sheets shall be removed from the finishing device, and the number N of the last printed image-receiving sheets are printed again. The number N is preconfigured in the control unit independently of the error signal received from the finishing device.

7 Claims, 1 Drawing Sheet

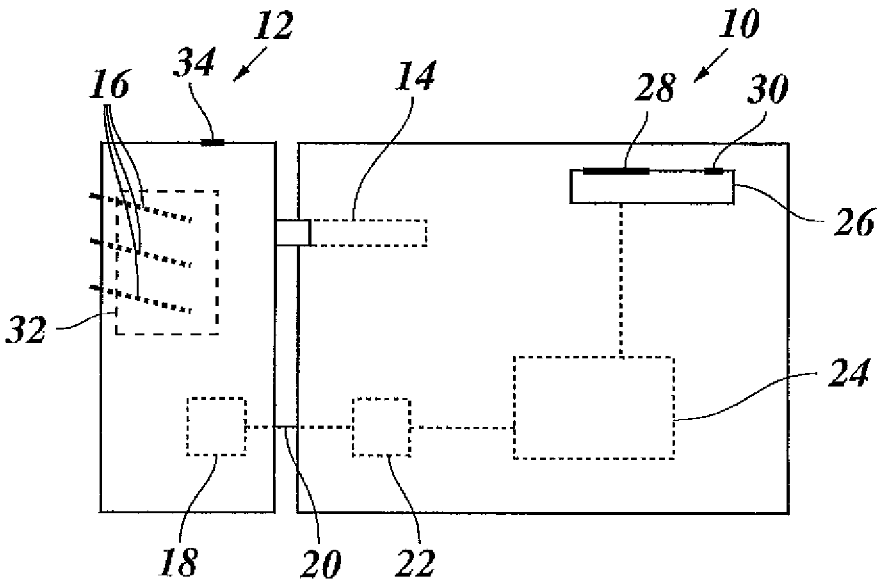
12
10
34
16
14
28
30
26
32
24
18
20
22

PRINTING DEVICE

CROSS-REFERENCE TO RELATED APPLICATIONS

This application claims priority under 35 U.S.C. §119(a) to Application No. 07122098.2, filed in Europe on Dec. 3, 2007, the entirety of which is expressly incorporated herein by reference.

BACKGROUND OF THE INVENTION

1. Field of the Invention

The present invention is related to a printing device such as a printing or copying system, which is adapted for being coupled to a finishing device for further processing of a printed image-receiving member. Furthermore, the present invention is related to a printing apparatus including such printing device and such finishing device. Examples of further processing at the finishing device are the forming of booklets, trimming or cutting the printed image-receiving member into image-receiving member units, stapling, punching, folding or sorting of the printed image-receiving member units. The image-receiving member units are, for example, sheets or pages cut from an image-receiving member web.

2. Description of Background Art

In general, a finishing device is a separate module that is coupled to the printing device. To this end, the printing device comprises an output unit for outputting a printed image-receiving sheet to the finishing device when the finishing device is arranged at the printing device.

During further processing of the printed image-receiving sheet, an error might occur at the finishing device. This error has to be signalled to the printing device in order to interrupt the current printing and initiate a recovery process.

U.S. Pat. No. 3,588,472 discloses a printing device and a finishing device having a smart interface for connecting the printing device and the finishing device, thereby extending the control of the printing device to the finishing device. When an error occurs in the finishing device, the kind or location of the error is known to the printing device. A control unit of the printing device can, for example, perform a finisher error recovery procedure, wherein an error message is displayed to the user of the printing device indicating the position of the error as well as instructions on how to recover. For example, when a number of printed sheets are stuck inside the finishing device, the user can be requested to remove the sheets, and afterwards, these sheets are printed again.

However, there are finishing devices which do not have a smart interface capability. In the worst case, no information is available to the printing device about the error conditions of an external finishing device.

U.S. Pat. No. 4,327,993 discloses a printing device comprising an output unit for outputting a printed image-receiving sheet to a finishing device arranged at the printing device. The finisher is arranged for communicating an error signal originating from a detector in the finishing section to the printer control unit. The printer control unit is configured to control a finisher error recovery procedure after the reception of information that an error has occurred in the finisher section. The finisher error recovery procedure comprises the steps of outputting an error message to the user display such that all sheets in the finisher path shall be removed and the printing job shall be resumed.

EP 0 478 349 A2 discloses a printing device comprising a control unit performing a recovery procedure after the occurrence of an error. Defective copies have to be purged before the respective copy set is completed.

U.S. Application Publication No. 2007/0166055 discloses a printing apparatus with an attached finisher. An interface is provided to communicate an error in the finishing device to a control unit of the apparatus and to display an error or job cancel message on a user display.

SUMMARY OF THE INVENTION

It is an object of the present invention to provide a printing device of the kind described initially which can be combined with a finishing device without the described smart interface capability. Especially, it is an object of the present invention to provide a printing device capable of controlling a finisher error recovery procedure, wherein the printing device merely receives a simple error signal from the finishing device, which error signal consists only of the information that an error has occurred.

According to the present invention, this object is achieved by a printing device for printing on an image-receiving sheet, said printing device comprising: an output unit configured to output printed image-receiving sheets to a finishing device for further processing of the printed image-receiving member when the finishing device is arranged at the printing device; an interface configured to connect to the finishing device, said interface being arranged for receiving an error signal from the finishing device when the finishing device is connected to the interface; a communication unit configured to output an error message to a user of the printing device; and a control unit configured to control, when an error signal is received from the finishing device via the interface, a finisher error recovery procedure, wherein an error message is output to the user of the printing device by means of the communication unit, said error message containing the information that a number N of image-receiving sheets shall be removed from the finishing device, and the number N of the last printed image-receiving sheets are printed again, wherein the number N is pre-configured in the control unit independently of the error signal received from the finishing device.

Upon receipt of the error signal by the interface, the control unit stops a current print job of the printing device.

Usually, the N last printed image-receiving sheets will belong to the same current print job. However, if more than one print job is processed at a time, e.g. when sheets of a first print job may still be present in the processing path of the finishing device while sheets of a second print job already have been printed, image-receiving sheets of both subsequent print jobs will be reprinted.

By displaying or otherwise outputting an error message, which transfers the information to the user that a number N of image-receiving sheets shall be removed from the finishing device, it can be assured that these units include that one/those ones which caused the error in the finishing device or were in any way affected by the error.

Because the error signal of the finishing device consists only of information that an error has occurred, no information about a position of the error or the number of image-receiving sheets involved has to be transferred to the printing device. When an error occurs at the finishing device, the error signal is sent to the interface of the printing device, but there is no further information regarding the error transferred to the printing device. Nevertheless, when the user has removed the last N image-receiving sheets printed from the finishing device, by printing these image-receiving sheets again, a reliable recovery process is provided.

Preferably, the number N is greater than 1. Thus, cases can be handled where more than one sheet or page can be in a processing path of the finishing device at a time.

The number N could be any positive integer number. Preferably, the number N approximately corresponds to the maximum number of image-receiving sheets that are, during normal operation, in a processing path of the finishing device at any time. Especially, the printing device is adapted to execute a print job involving a number of image-receiving sheets that is greater than N. In other words, the reprinting of the number N image-receiving sheets does not mean that the complete print job would always have to be printed again.

Preferably, the number N is at least the maximum number of image-receiving sheets that are, during normal operation, in a processing path of the finishing device at any time. For example, when there are three image-receiving sheets in the processing path and a fourth image-receiving sheet will not enter the processing path until the first image-receiving sheet has left the processing path, e.g. by being output on a tray, there are at maximum three image-receiving sheets, during normal operation, in the processing path at any time. Therefore, when an error occurs, it will be sufficient to remove the three last printed image-receiving sheets from the finishing device and print these again. Thus, a proper error recovery is achieved regardless of which image-receiving sheet has caused the error.

According to the present invention, the finisher error recovery is performed under the assumption that it is sufficient to reprint the number N of sheets, if an error occurs in the finishing device. When the finishing device reports an error, the last N sheets that have arrived at the finishing device will be removed by the user. After restarting the system, the printing device will send again the last N sheets to the finishing device.

When an error in the finishing device occurs at a time where less than N image-receiving sheets of a print job/subsequent print jobs have been output to the finishing device, this number being M (M<N), the error message will contain the information that a number of M image-receiving sheets shall be removed from the finishing device, and in the finishing error procedure, only the M last printed image-receiving sheets will be printed again.

In a similar way as described above, the finisher error recovery procedure could also include the removal of sheets that are present in a processing path of the printing device and also printing these image-receiving sheet units again.

In one embodiment, an interface is arranged to receive a value of N from the finishing device, N being a predetermined number. For example, the value of N is received during an initialization process of the finishing device. For example, upon connecting the finishing device to the printing device and initializing both, the finishing device could transfer the value of N to the printing device. Afterwards, during operation of the printing device and the finishing device, this predetermined number N is used in the finisher error recovery procedure as described above, whenever an error occurs in the finishing device.

Preferably, the finisher error recovery procedure further comprises waiting for a user interaction before printing the N last printed image-receiving sheet units again. Examples of the user interaction are: pressing a button of the printing device, pressing a button of the finishing device, or opening and closing a flap of the finishing device, e.g. in order to remove an image-receiving sheet unit from the finishing device.

For example, the interface is arranged for receiving a continue signal from the finishing device when the finishing device is connected to the interface, said continue signal being triggered by a user interaction with the finishing device. In the finisher error recovery procedure, the control unit then prints the N last printed image-receiving sheets again, upon receipt of the continue signal.

The object of the present invention is further achieved by providing a printing apparatus that includes the finishing device and the printing device of the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

The FIGURE (FIG. 1) is a schematic view of a printing device and a finishing device arranged at the printing device.

DETAILED DESCRIPTION OF THE PREFERRED EMBODIMENTS

The present invention will now be described with reference to the accompanying drawings, wherein the same reference numerals have been used to identify the same or similar elements throughout the several views.

The FIGURE (FIG. 1) illustrates a printing device 10 and a finishing device 12 arranged at the printing device 10, which together form a printing apparatus. The printing device 10 is, for example, a printer that prints on an image-receiving material e.g. a web of paper, which is supplied from a reel.

The printed image-receiving sheet is output through an output unit 14 to the finishing device 12, which is suitably arranged at the printing device 10. The finishing device 12, for example, cuts the web of image-receiving material into image-receiving sheets or pages, which are then, for example, sorted onto output trays 16 of the finishing device 12.

When an error occurs at the finishing device 12, an error signal consisting of information that an error has occurred is sent from an interface 18 of the finishing device 12 through an electrical connection 20 to an interface 22 of the printing device 10. The interface 22 is connected to a control unit 24 of the printing device 10. The control unit 24 is also connected to a user communication unit 26 having a display 28 and at least one button 30. Furthermore, the control unit 24 is connected to diverse circuits of the printing device 10 for controlling the printing process.

When an error signal from the finishing device is received by the interface 22, the control unit 24 initiates a finisher error recovery procedure, as will be described in the following.

The control unit 24 stops printing and outputs an error message to the user by displaying on the display 28 a suitable message, e.g. "Finishing error. Please remove the last three pages from the finishing device, and then press the continue-button of the finishing device." The user can then open a flap 32 at the finishing device in order to remove the pages from the finishing device. Afterwards, the user presses a continue button 34 at the finishing device. Pressing the button 34 triggers a continue signal, which is sent from the interface 18 to the interface 22. Upon receipt of the continue signal by the interface 22, the control unit 24 resumes printing by printing the three last printed image-receiving sheets of the current print job again. As an alternative to pressing the button 34, the user can also press the button 30 at the printing device 10 to continue printing.

As a further alternative, the continue signal could be triggered by the user closing the flap 32 after removing the pages from the finishing device 12.

In the described example, the user is asked to remove N=3 image-receiving sheets from the finishing device, and this number N of image-receiving sheets is then printed again. However, N=3 is only one possible example for illustrating the present invention. In general, the number N is chosen to be at least the maximum number of image-receiving sheets that are, during normal operation, in a processing path of the finishing device at any time. Thus, in the example described, there will be no more than N=3 pages travelling through the processing path of the finishing device 12 at any time. Before another image-receiving sheet unit or page enters the finishing device 12, at least one of the previous pages is already output on an output tray 16. Thus, at maximum N=3 pages can be affected by an error of the finishing device.

Upon initialization of the printing device 10 and the finishing device 12, the finishing device 12 communicates the value of N=3 to the printing device 10.

Alternatively, in case the finishing device 12 is not arranged to communicate the value of N, the control unit 24 of the printing device 10 sets the number N to a predetermined default value or a value that has previously been set by a service engineer. The only information that is needed to define this value is the maximum number of sheets that can be in the processing path in the external finishing device at any time.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A printing device for printing on an image-receiving sheet, said printing device comprising:

an output unit configured to output printed image-receiving sheets to a finishing device for further processing of the printed image-receiving member when the finishing device is arranged at the printing device;

an interface configured to connect to the finishing device, said interface being arranged for receiving an error signal from the finishing device when the finishing device is connected to the interface;

a communication unit configured to output an error message to a user of the printing device; and a control unit configured to control, when an error signal is received from the finishing device via the interface, a finisher error recovery procedure, wherein an error message is output to the user of the printing device by means of the communication unit, said error message containing the information that a number N of image-receiving sheets shall be removed from the finishing device, and the number N of the last printed image-receiving sheets are printed again, wherein the number N is a fixed number, and is pre-configured in the control unit, independently of the error signal received from the finishing device, before operations of the printing device and the finishing device;

wherein the number N is greater than 1, wherein the number N is predetermined according to a characteristic of the finishing device, and is independent of a current printing job.

2. The printing device according to claim 1, wherein the interface is arranged to receive a signal indicating the value of the number N from the finishing device.

3. The printing device according to claim 1, wherein the finisher error recovery procedure further comprises waiting for a user interaction before printing the number N of the last printed image-receiving member units again.

4. The printing device according to claim 3, wherein the user interaction is the user pressing a button of the printing device or of the finishing device.

5. The printing device according to claim 1, wherein the interface is arranged for receiving a "continue" signal from the finishing device when the finishing device is connected to the interface, said "continue" signal being triggered by a user interaction with the finishing device.

6. A printing apparatus comprising:

a printing device for priming on an image-receiving sheet; and a finishing device for further processing of the primed image-receiving member, said finishing device being arranged at the printing device, wherein said printing device comprises:

an output unit configured to output primed image-receiving sheets to the finishing device;

an interface connected to the finishing device, said interface being arranged for receiving an error signal from the finishing device;

a communication unit configured to output an error message to a user of the priming device; and a control unit configured to control, when an error signal is received from the finishing device via the interface, a finisher error recovery procedure, wherein an error message is output to the user of the priming device by means of the communication unit, said error message containing the information that a number N of image-receiving sheets shall be removed from the finishing device, and the number N of the last printed image-receiving sheets are printed again, wherein the number N is a fixed number, and is pre-configured in the control unit, independently of the error signal received from the finishing device, before operations of the printing device and the finishing device;

wherein the number N is greater than 1, wherein the number N is predetermined according to a characteristic of the finishing device, and is independent of a current printing job.

7. The printing device according to claim 6, wherein the number N is at least the maximum number of image-receiving member units that are present in a processing path of the finishing device at any time during normal operation.

* * * * *